US006426707B1

(12) United States Patent
Prieto et al.

(10) Patent No.: US 6,426,707 B1
(45) Date of Patent: *Jul. 30, 2002

(54) SYSTEM TO CONTROL AND SUPERVISE VEHICLE TRANSIT IN THE PUBLIC PARKING AREAS

(75) Inventors: Javier Riesco Prieto; Pablo Riesco Prieto, both of Madrid (ES)

(73) Assignee: Quality Information Systems, S.A., Madrid (ES)

(*) Notice: Subject to any disclaimer, the term of this patent is extended or adjusted under 35 U.S.C. 154(b) by 0 days.

This patent is subject to a terminal disclaimer.

(21) Appl. No.: 09/598,409

(22) Filed: Jun. 21, 2000

(51) Int. Cl.[7] .................................................. B60Q 1/48
(52) U.S. Cl. ..................... 340/932.2; 340/928; 235/384
(58) Field of Search ............................. 340/932.2, 933, 340/928, 5.61, 5.24, 5.71, 6.1, 6.2; 705/13; 116/33; 194/302; 235/384, 375, 382

(56) References Cited

U.S. PATENT DOCUMENTS

| | | | | | |
|---|---|---|---|---|---|
| 5,473,318 | A | * | 12/1995 | Martel | 340/825.31 |
| 5,737,710 | A | * | 4/1998 | Anthonyson | 701/1 |
| 5,745,052 | A | * | 4/1998 | Matsuyama | 340/932.2 |
| 5,809,142 | A | | 9/1998 | Hurta et al. | |
| 5,877,969 | A | * | 3/1999 | Gerber | 364/562 |
| 6,025,784 | A | | 2/2000 | Mish | |
| 6,081,206 | A | | 6/2000 | Kielland | |
| 6,084,532 | A | * | 7/2000 | Prieto et al. | 340/933 |
| 6,140,941 | A | | 10/2000 | Dwyer et al. | |

OTHER PUBLICATIONS

U.S. application No. 09/584,774, filed Jun. 1, 2000.

* cited by examiner

*Primary Examiner*—Anh La
(74) *Attorney, Agent, or Firm*—Dennison, Scheiner & Schultz

(57) ABSTRACT

SYSTEM TO CONTROL AND SUPERVISE VEHICLE TRANSIT IN THE PUBLIC PARKING AREAS, consisting of the implementation of hardware and software permitting at the entrance of a public car park, the association of the radio-frequency identification device code located in the vehicle with the ticket dispatched or the used card. At the car park exit, this system permits to detect ticket and/or card exchange between different vehicles and accordingly to prevent the theft of a vehicle by using a ticket or card different from that related to said vehicle. Likewise, it detects and prevents the execution of fraudulent operations derived from exchanging tickets and/or cards.

2 Claims, 1 Drawing Sheet

SYSTEM TO CONTROL AND SUPERVISE VEHICLE TRANSIT IN THE PUBLIC PARKING AREAS

According to the title, the present invention refers to a SYSTEM TO CONTROL AND SUPERVISE VEHICLE TRANSIT IN THE PUBLIC PARKING AREAS whose main purposes are:

To prevent vehicle theft,

To prevent fraud derived from the fraudulent use of tickets or cards.

Among others, an advantage of the invention is that it permits the system object of the invention to be adapted to a public car parking whose entrance and exit control is carried out by means of tickets provided or not with a magnetic band, respecting the dispatch and reading devices as well as the barriers and other conventional car parking fittings.

STATE OF THE ART

Conventional public car parking management systems are based on the issue and reading of tickets where the time and entrance date are printed, without associating them to the vehicle for which they have been issued.

These conventional systems perform their ticket issue and reading work effectively but due to the lack of procedures which automatically check that each vehicle leaving the car park does so with the corresponding ticket, they cannot detect the vehicle theft, employee's pilfering and the user's fraud.

Different radio-frequency vehicle identification devices are currently marketed. There are those not requiring physical fastening to the vehicle, whilst others are designed in such a way that once installed in the vehicle, they break becoming useless if someone tries to remove them. Other devices may also be fixed by the vehicle manufacturer. Some devices are commonly known by the TAG initials.

INVENTIVE STEP

Prior installation of the hardware and software components materialising it, the invention achieves the aforementioned purposes by means of utilities and functions permitting:

To prevent the fraudulent use of tickets.

To detect attempts of vehicle theft.

The management of subscribers without needing to deliver them tickets with a magnetic band.

To have a field associating the ticket with the vehicle issuing it, being especially useful when the ticket is lost.

DESCRIPTION OF THE INVENTION

The invention consists in the implementation of a system which at the entrance of vehicles to a public car park, associates the radio-frequency identification device code fixed in the vehicle to the ticket number it issues and at the vehicle exit, the system checks that when it leaves the latter uses the ticket assigned to it at the entrance and not a different one.

The ticket code or number may be incorporated in a printed, magnetic, bar code way or any other mode, being the main feature of the ticket code or number, which is unique and individual for each one of those used in the car park.

If the user employs a card instead of a ticket, the comparison is made with the card number in the same way as with the ticket number.

The system of the invention is comprised by a radio-frequency reader, an antenna capturing the signal of the radio-frequency code identification device fixed to the vehicle and the hardware and software which, when the vehicle leaves the car parking, allows to verify the association between the code captured by the radio-frequency sensor and the ticket identification code, which was carried out at the vehicle's entrance to the public car parking.

The system works in real time associating the ticket number to the radio-frequency identification device code located in the vehicle and optionally to the vehicle image or images and/or those of the driver when issuing the ticket. Optionally and by means of other devices, vehicle characteristics such as height or number of axles may be also recorded.

If the vehicle entrance information (radio-frequency identification device code and the ticket code issued) matches with the exit information (radio-frequency identification device code and ticket code used), vehicle exit is automatically authorised. If it does not match, the system triggers an alarm, it being possible to require the intervention of the security guard.

The same procedure used with the ticket may be applied to subscriber cards, with the only difference that at the entrance the ticket is issued by the machine. The card is introduced by the driver. In this way, when the subscriber introduces the card, the latter is assigned the code of the radio-frequency identification device located in the vehicle, checking at the exit that said card is associated to this radio-frequency identification code.

PROBLEMS SOLVED BY THE SYSTEM

The problems solved by implementing the system of the invention are as follows:

To prevent the use of fraudulently obtained tickets to remove a vehicle that has remained inside for a long period of time, by paying an amount corresponding to a shorter time.

To solve ticket loss problems: when a user loses a ticket, his/her vehicle may be located by the system searching for the radio-frequency identification device code or by the entrance date and time.

To detect attempts to steal the vehicle by using a ticket different to the one issued for said vehicle on entrance. If the user loses the ticket, nobody could use it to steal the vehicle since nobody would know to whom the vehicle belonged. Evidently, the users should be warned not to change tickets between them and not to leave tickets inside vehicles.

It is possible to know how long a specific vehicle has been inside the car parking, since although the ticket is in the user's power, by means of a radio-frequency identification device code for the vehicle, the record associated to its entrance may be located. A conventional system may not provide this information since the tickets are carried by the users, so that there is no association between each ticket and the vehicle for which it was issued.

Customised statistics: The system produces customised records for each vehicle, it being possible to know, for example, how many times a specific vehicle has used the car parking.

To detect undesirable vehicle transit: the possibility exists of warning the security guard when a vehicle belonging to a black list database intends to enter or leave the car parking, since in said database the radio-frequency identification device code is recorded for the vehicles whose access or departure from the car parking are not desired.

All detected incidents are recorded, it being optionally possible to associate each incident record with the captured images, permitting a fast and comfortable control.

Optionally, and as a complementary utility, the implementation of the radio-frequency identification system permits the possibility of dynamic transits for the subscribers, that is, without using either tickets or cards, either by fix payment for a time period or by later payment according to the car park used. This dynamic mode for the subscribers has the drawback that any person may remove the vehicle from the car parking without needing the ticket or card associated to the vehicle.

A safer mixed operation mode is to identify whether a vehicle is subscribed by its radio-frequency identification device code installed in the vehicle and to issue a ticket which assures that the subscriber has the vehicle inside and as a protection so that nobody without the ticket may remove the vehicle from the car parking, permitting the subscriber to leave the car parking without having to pay anything in that moment.

At the entrance, another possibility offered by the association of the ticket to the radio-frequency identification code located in the vehicle is that of paying in the automatic teller machine without the need to introduce the ticket in the checker at the exit, hence authorising the exit automatically on capturing the radio-frequency identification code. This is possible because the control computer knows that the stay associated to this vehicle has been paid. The drawback of this operation is that at the exit, the matching of the ticket and the radio-frequency identification code cannot be checked, but it may be interesting to accelerate the exit at rush hours.

Figure 1:
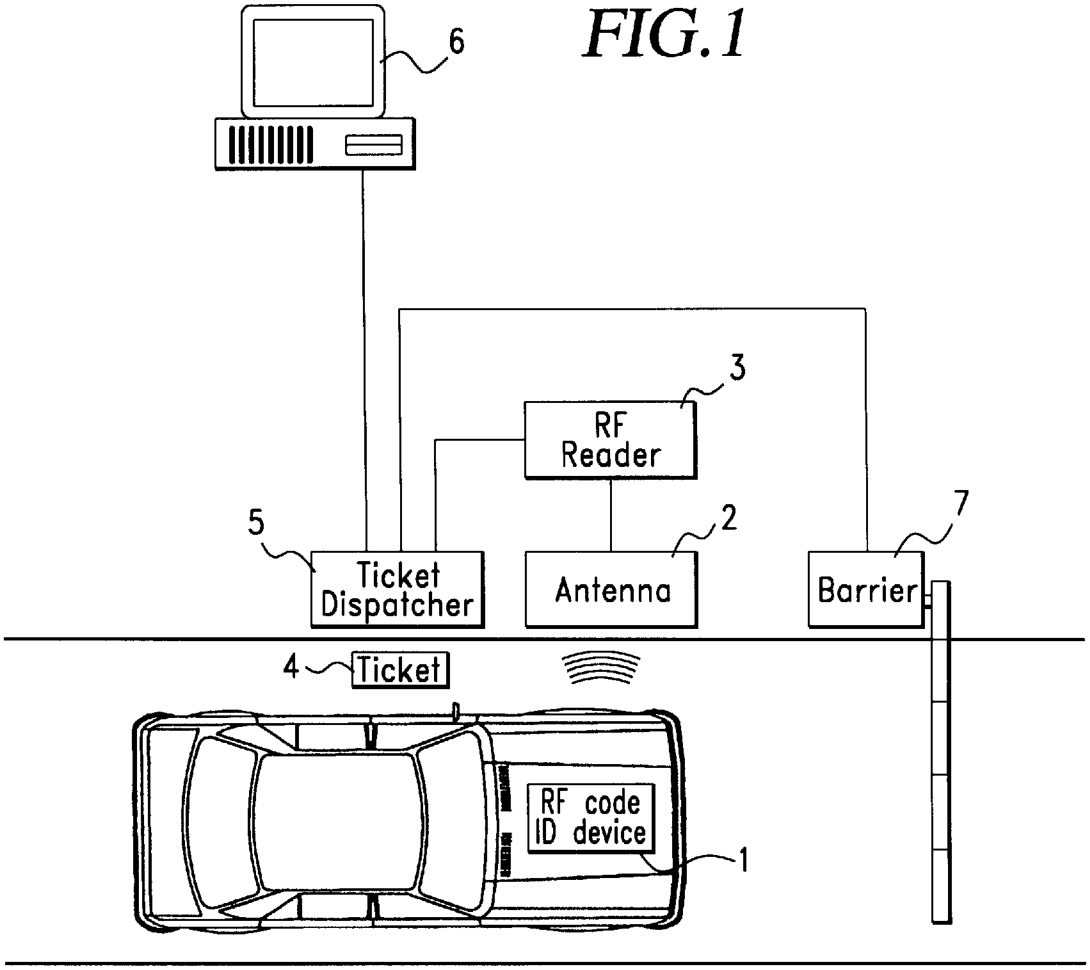
FIG. 1 is a top plan view of a vehicle and a schematic view of the various components of the present invention.

The drawing shows the implementation of an antenna (2) receiving the signal from the radio-frequency code identification device (1) located in the vehicle and sending it to the radio-frequency reader (3), which extracts the code and sends it to the ticket and card dispatcher/checker (5).

If a car park entrance is being dealt with, the radio-frequency identification device code located in the vehicle (1) is associated to the issued ticket or the introduced card (4). This association may be stored in the control computer (6) and/or printed on the ticket or card (4).

If a car park exit is being considered, it is checked that the radio-frequency identification device code located in the vehicle (1) and the ticket or card (4) code or number introduced in the checker (5) match with the association made at the entrance. If this is the case, and if other controls made are passed (like for example, paying the stay), the vehicle exit is authorised, activating the raising of the barrier (7). In the case of a mismatch, an alarm is activated, it being possible to demand the manual intervention of the security guard by using the control computer (6).

For greater clarity, the different components are separated in the figure, but depending on the model, some may permit several of them to be integrated in a single component, such as for example the antenna (2) and a radio-frequency reader (3).

In the figure, (4) represents the ticket or card used by the driver. Normally, if he/she is a rotative user, a ticket is issued at the entrance and received by the driver. At the exit, the driver introduces it in the checker, where the ticket remains inside. If we are dealing with a user with a card, the driver introduces the card both at the entrance and exit and in both cases, the checker returns it, the driver keeping it for further access.

What is claimed is:

1. A method for controlling vehicular access and egress from a parking facility comprising the steps of:

providing a controllable entrance gate;

providing a ticket dispenser proximate to said entrance gate;

detecting the presence of a vehicle at said entrance gate;

reading a radio frequency identification code from the vehicle;

printing and dispensing a ticket that includes a ticket identifier and said radio frequency identification code;

providing a controllable exit gate;

providing a ticket reader at said exit gate;

detecting the presence of a vehicle at said exit gate;

reading a radio frequency identification code from said vehicle at said exit gate;

reading the radio frequency identification code from said ticket at said exit gate; and, automatically opening the exit gate if the radio frequency identification code read from said ticket matches the radio frequency identification code read at the exit gate.

2. The method of claim 1 including the additional steps of:

triggering an alarm if the radio frequency identification code read at the exit gate does not correspond to the radio frequency identification code read at the exit gate.

* * * * *